US011513021B2

(12) United States Patent
Kawase et al.

(10) Patent No.: US 11,513,021 B2
(45) Date of Patent: Nov. 29, 2022

(54) PHYSICAL QUANTITY MEASURING DEVICE WITH IMPROVED CAP SEALING

(71) Applicant: NAGANO KEIKI CO., LTD., Tokyo (JP)

(72) Inventors: Nobuaki Kawase, Tokyo (JP); Yuri Sugahara, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 59 days.

(21) Appl. No.: 17/208,122

(22) Filed: Mar. 22, 2021

(65) Prior Publication Data

US 2021/0302256 A1    Sep. 30, 2021

(30) Foreign Application Priority Data

Mar. 26, 2020   (JP) .............................. JP2020-056211
Oct. 21, 2020   (JP) .............................. JP2020-176653

(51) Int. Cl.
| | | |
|---|---|---|
| *G01L 7/00* | (2006.01) | |
| *G01L 27/00* | (2006.01) | |
| *G01L 7/08* | (2006.01) | |
| *G01L 19/14* | (2006.01) | |

(52) U.S. Cl.
CPC .............. *G01L 27/002* (2013.01); *G01L 7/08* (2013.01); *G01L 19/148* (2013.01)

(58) Field of Classification Search
None
See application file for complete search history.

(56) References Cited

U.S. PATENT DOCUMENTS

| | | | |
|---|---|---|---|
| 9,952,114 B2 * | 4/2018 | Toba ......................... | G01L 7/08 |
| 2013/0033841 A1 | 2/2013 | Eckhardt et al. | |
| 2019/0094054 A1 * | 3/2019 | Lais ...................... | G01F 1/3273 |
| 2019/0391031 A1 * | 12/2019 | Kawase ................ | G01L 19/148 |

FOREIGN PATENT DOCUMENTS

JP   2015-184259   10/2015

OTHER PUBLICATIONS

European Search Report dated Aug. 18, 2021, 9 pages.

* cited by examiner

*Primary Examiner* — Lisa M Caputo
*Assistant Examiner* — Nigel H Plumb
(74) *Attorney, Agent, or Firm* — Rankin, Hill & Clark LLP

(57) ABSTRACT

A physical quantity measuring device includes a cylindrical case, a cap member, and a sealing member. The cap member covers a circumferential portion of a through-hole of the cylindrical case, while the sealing member provides a seal between the through-hole and the cap member. The cap member is pivotally supported by an attachment target portion of a lid member so that the cap member is rotatable between a first orientation and a second orientation. A cap member engagement portion is insertable into an engagement-portion insertion hole in the first orientation and is engageable with the attachment target portion in the second orientation. A linear member of the sealing member is located, in the first orientation, in a region in a rotation direction from the first orientation to the second orientation. The linear member prevents loss of the cap member and is replaceable, together with the seal member, if damaged.

9 Claims, 15 Drawing Sheets

PHYSICAL QUANTITY MEASURING DEVICE WITH IMPROVED CAP SEALING

The entire disclosure of Japanese Patent Application No. 2020-056211 filed on Mar. 26, 2020 and Japanese Patent Application No. 2020-176653 filed on Oct. 21, 2020 is expressly incorporated by reference herein.

TECHNICAL FIELD

The present invention relates to a physical quantity measuring device.

BACKGROUND ART

A physical quantity measuring devices including a built-in electronic adjuster for adjusting an electronic circuit provided on a circuit board is known (for instance, Patent Literature 1 (JP 2015-184259 A)).

In Patent Literature 1, an operation hole to be used for adjusting the electronic adjuster is provided to a lid member attached to an open end of a cylindrical case, so that the electronic adjuster is adjustable without detaching a lid member from the case.

Further, in order to keep water and the like from entering an inside of the case through the operation hole, a cap member for closing the operation hole is detachably attached in Patent Literature 1. A first end of a loss-prevention member is connected to the cap member in order to prevent loss of the cap member.

According to Patent Literature 1, the lid member has to be attached to the case after the first end of the loss-prevention member is connected to the cap member and a second end of the loss-prevention member is engaged with the lid member. Thus, after the lid member is attached to the case, the cap member connected with the first end of the loss-prevention member cannot be attached. Accordingly, after the case has been assembled, a damage on the loss-prevention member, which cannot be exchanged unless the case is disassembled, necessitates complicated repair work.

SUMMARY OF THE INVENTION

An object of the invention is to provide a physical quantity measuring device capable of facilitating repair work.

A physical quantity measuring device according to an aspect of the invention includes: a cylindrical case whose circumferential portion is provided with a through-hole; a sensor module housed in the cylindrical case and configured to detect a physical quantity; a joint attached with the sensor module, the joint being disposed to cover a first opening of the cylindrical case; a lid member disposed to cover a second opening of the cylindrical case; a circuit board including an electronic circuit configured to receive a signal detected by the sensor module and an electronic adjuster configured to adjust the electronic circuit, the circuit board being housed in the cylindrical case; a cap member configured to be attached to cover the through-hole; and a sealing member configured to provide a seal between the through-hole and the cap member, where the electronic adjuster includes an operable portion disposed at a position corresponding to the through-hole, the lid member includes a circuit-board support supporting the circuit board and an attachment target portion for the cap member to be detachably attached, the cap member includes a cap member body disposed outside the cylindrical case and configured to cover the through-hole, a cap member shaft extending from a bottom surface of the cap member body, and a cap member engagement portion extending from an end of the cap member shaft in a radial direction of the cap member shaft, the sealing member includes an annularly-shaped sealing member body surrounding the cap member shaft, a linear member extending from the sealing member body, and a sealing-member engagement portion provided at an end of the linear member, the attachment target portion includes: a shaft insertion hole into which the cap member shaft is insertable; an engagement-portion insertion hole into which the cap member engagement portion is insertable, the engagement-portion insertion hole being continuous with the shaft insertion hole; and a groove in which the linear member is rested, the groove being continuous with the shaft insertion hole, the cap member is pivotally supported by the attachment target portion to be rotatable to take a first orientation and a second orientation, the cap member engagement portion being insertable into the engagement-portion insertion hole in the first orientation and engageable with the attachment target portion in the second orientation, and in the first orientation, the linear member is located in a region in a rotation direction from the first orientation to the second orientation with respect to the cap member engagement portion as viewed in a direction of the cap member shaft.

In the above aspect of the invention, the cap member includes the cap member body disposed outside the cylindrical case to cover the through-hole, the cap member shaft extending from the bottom surface of the cap member body, and the cap member engagement portion extending from the end of the cap member shaft in the radial direction of the cap member shaft. Further, the sealing member includes the annularly-shaped sealing member body surrounding the cap member shaft, the linear member extending from the sealing member body, and the sealing-member engagement portion provided to the end of the linear member. The attachment target portion, to which the cap member is detachably attached, is provided with: the shaft insertion hole into which the cap member shaft is insertable; the engagement-portion insertion hole into which the cap member engagement portion is insertable, the engagement-portion insertion hole being continuous with the shaft insertion hole; and the groove, in which the linear member is rested. Thus, the cap member, whose cap member engagement portion is insertable into the engagement-portion insertion hole in the first orientation and engageable with the attachment target portion in the second orientation, is detachably attached to the attachment target portion.

In the first orientation, the linear member is located in the region in the rotation direction from the first orientation to the second orientation with respect to the cap member engagement portion as viewed in an axial direction of the cap member shaft. Accordingly, by inserting the cap member shaft and the linear member into the shaft insertion hole with the cap member taking the first orientation and subsequently, rotating the cap member from the first orientation to the second orientation, the linear member, which is biased by the engagement portion, is rotated in the same direction as that of the cap member. Then, the linear member, which is guided into the groove of the attachment target portion while being moved in the rotation direction, can be rested in the groove. Accordingly, even when the cap member is to be attached after the cylindrical case is assembled, the linear member for preventing the loss of the cap member can be attached to the attachment target portion disposed within the cylindrical case. Thus, even if the linear member is damaged after assembling the cylindrical case, the sealing member having the linear member can be easily exchanged.

A physical quantity measuring device according to another aspect of the invention includes: a cylindrical case whose circumferential portion is provided with a through-hole; a sensor module housed in the cylindrical case and configured to detect a physical quantity; a joint attached with the sensor module, the joint being disposed to cover a first opening of the cylindrical case; a lid member disposed to cover a second opening of the cylindrical case; a circuit board including an electronic circuit configured to receive a signal detected by the sensor module and an electronic adjuster configured to adjust the electronic circuit, the circuit board being housed in the cylindrical case; a cap member configured to be attached to cover the through-hole; and a sealing member configured to provide a seal between the through-hole and the cap member, where the electronic adjuster includes an operable portion disposed at a position corresponding to the through-hole, the lid member includes a circuit-board support supporting the circuit board and an attachment target portion for the cap member to be detachably attached, the cap member includes a cap member body disposed outside the cylindrical case and configured to cover the through-hole, a cap member shaft extending from a bottom surface of the cap member body, and a cap member engagement portion extending from an end of the cap member shaft in a radial direction of the cap member shaft, the sealing member includes an annularly-shaped sealing member body surrounding the cap member shaft, a linear member extending from the sealing member body, and a sealing-member engagement shaft provided to an end of the linear member and extending along a direction intersecting the linear member, the attachment target portion includes: a shaft insertion hole into which the cap member shaft is insertable; an engagement-portion insertion hole into which the cap member engagement portion is insertable, the engagement-portion insertion hole being continuous with the shaft insertion hole, and an engagement-shaft insertion hole in which the linear member is rested, the sealing-member engagement shaft being insertable into the engagement-shaft insertion hole, and the cap member is pivotally supported by the attachment target portion to be rotatable to take a first orientation and a second orientation, the cap member engagement portion being insertable into the engagement-portion insertion hole in the first orientation and engageable with the attachment target portion in the second orientation.

In the above aspect of the invention, the cap member includes the cap member body disposed outside the cylindrical case to cover the through-hole, the cap member shaft extending from the bottom surface of the cap member body, and the cap member engagement portion extending from the end of the cap member shaft in the radial direction of the cap member shaft. The sealing member includes the annularly-shaped sealing member body surrounding the cap member shaft, the linear member extending from the sealing member body, and the sealing-member engagement shaft provided to the end of the linear member and extending along the direction intersecting the linear member. The attachment target portion, to which the cap member is detachably attached, includes: the shaft insertion hole into which the cap member shaft is insertable; the engagement-portion insertion hole into which the cap member engagement portion is insertable, the engagement-portion insertion hole being continuous with the shaft insertion hole; and the engagement-shaft insertion hole in which the linear member is rested and the sealing-member engagement shaft is insertable. Thus, the cap member, whose cap member engagement portion is insertable into the engagement-portion insertion hole in the first orientation and engageable with the attachment target portion in the second orientation, is detachably attached to the attachment target portion.

The attachment target portion is provided with the engagement-shaft insertion hole, into which the sealing-member engagement shaft is insertable. Thus, the sealing member can be attached to the attachment target portion by initially inserting the sealing-member engagement shaft into the engagement-shaft insertion hole and subsequently resting the linear member into the engagement-shaft insertion hole. At this time, since the linear member intersects the sealing-member engagement shaft, after the linear member is rested in the engagement-shaft insertion hole, the sealing-member engagement shaft is engaged with the attachment target portion. Specifically, even when the linear member is pulled in a direction for detaching the sealing member, the sealing-member engagement shaft is not easily detached from the attachment target portion. Accordingly, the loss of the cap member can be prevented by attaching the sealing member, with which the cap member is attached, to the attachment target portion through the above process.

Specifically, even when the cap member is to be attached after the cylindrical case is assembled, the linear member for preventing the loss of the cap member can be attached to the attachment target portion disposed within the cylindrical case. Thus, even if the linear member is damaged after assembling the cylindrical case, the sealing member having the linear member can be easily exchanged.

In the physical quantity measuring device according to the above aspect of the invention, it is desirable that a projection tapered toward an end is provided at a first end of the sealing-member engagement shaft, and a dent is provided at a second end of the sealing-member engagement shaft along an axial direction of the sealing-member engagement shaft.

According to the above arrangement, the projection of the sealing-member engagement shaft can be inserted into the engagement-shaft insertion hole using a tool such as a screwdriver being inserted into the dent of the sealing-member engagement shaft. The sealing-member engagement shaft thus can be easily inserted into the engagement-shaft insertion hole.

In the physical quantity measuring device according to the above aspects of the invention, it is preferable that the attachment target portion is provided with an engaging protrusion protruding toward the through-hole and engageable with the through-hole.

According to the above arrangement, the engaging protrusion of the attachment target portion can be engaged with the through-hole, so that the position of the attachment target portion with respect to the through-hole can be easily determined. Thus, the physical quantity measuring device can be easily assembled.

In the physical quantity measuring device according to the above aspects of the invention, it is preferable that the cap member engagement portion includes a first engagement portion and a second engagement portion provided opposite the first engagement portion across the cap member shaft, the second engagement portion being sized differently from the first engagement portion, and the engagement-portion insertion hole includes a first-engagement-portion insertion hole corresponding to the first engagement portion and a second-engagement-portion insertion hole corresponding to the second engagement portion, the second-engagementportion insertion hole being provided opposite the first-engagement-portion insertion hole across the shaft insertion hole.

According to the above arrangement, the cap member engagement portion, which includes the first engagement portion and the second engagement portion, can be reliably engaged with the attachment target portion in the second orientation. Accordingly, the cap member can be restrained from falling off from the attachment target portion in the second orientation.

In the physical quantity measuring device according to the above aspects of the invention, it is preferable that the cap member body is pentagonal.

According to the above arrangement, the pentagonal shape of the cap member body allows a user to easily recognize whether the cap member is in the first orientation or in the second orientation.

BRIEF DESCRIPTION OF DRAWING(S)

DESCRIPTION OF EMBODIMENT(S)

First Exemplary Embodiment

A first exemplary embodiment of the invention will be described below with reference to the attached drawings.

Figure 1:
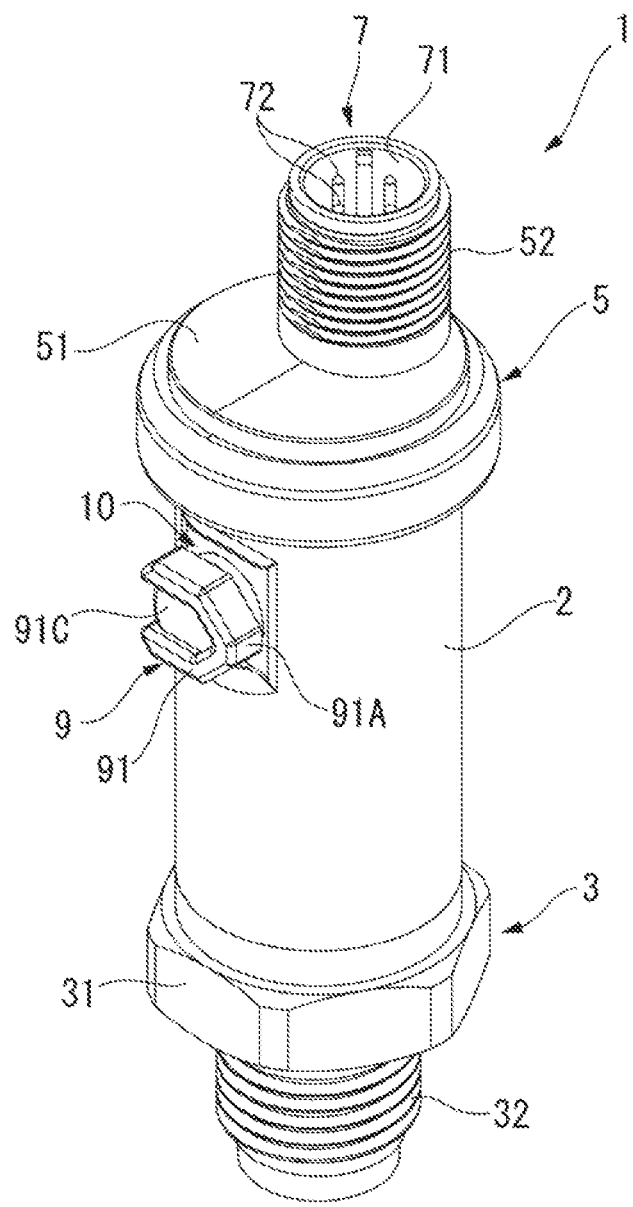
FIG. 1 is a perspective view showing an outline of a physical quantity measuring device according to a first exemplary embodiment of the invention.
Figure 2:
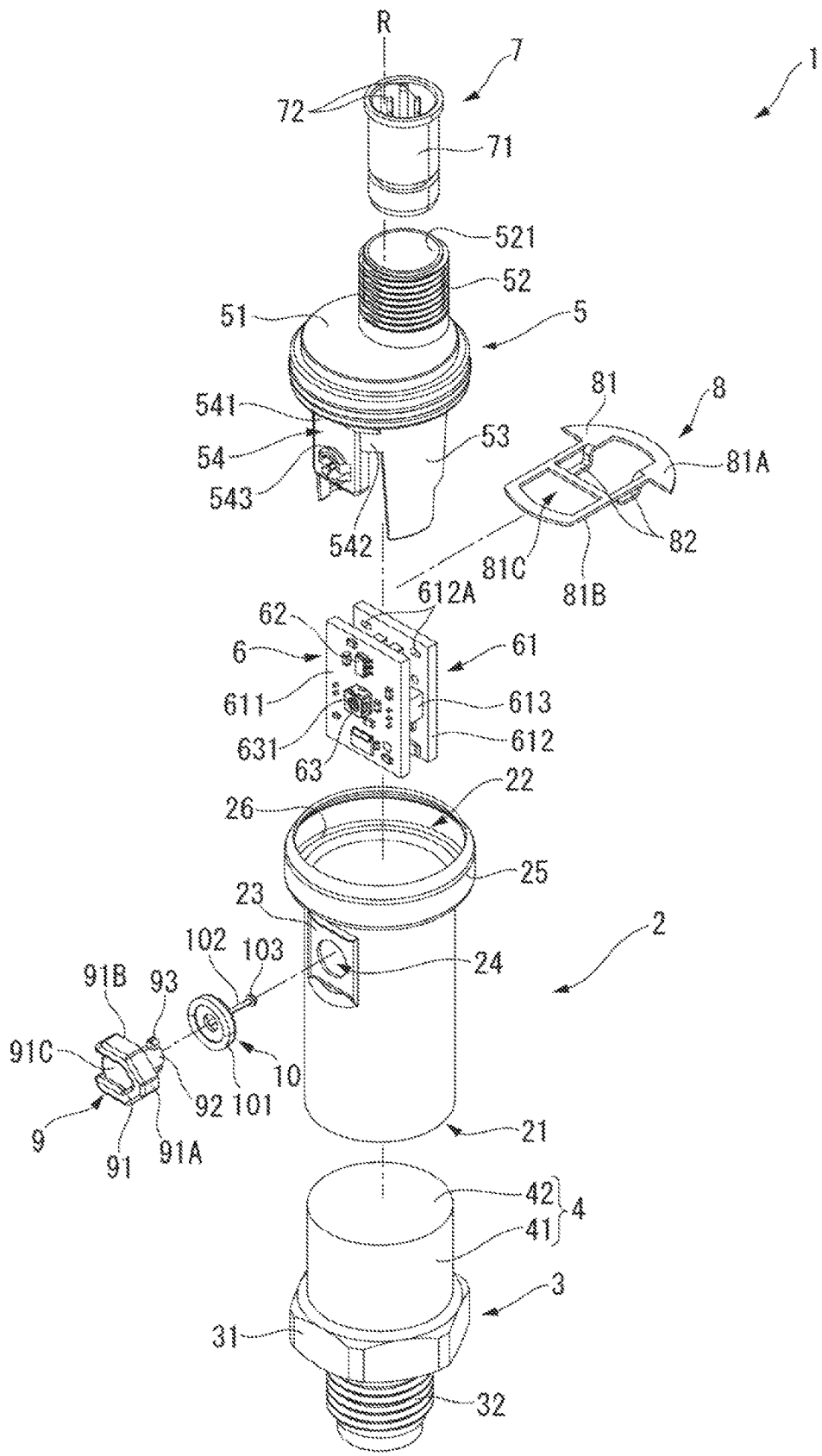
FIG. 2 is an exploded perspective view showing the outline of the physical quantity measuring device according to the first exemplary embodiment.

FIG. 1 is a perspective view showing an outline of a physical quantity measuring device 1 according to the first exemplary embodiment. FIG. 2 is an exploded perspective view showing the outline of the physical quantity measuring device 1. It should be noted that the physical quantity measuring device 1 according to the present exemplary embodiment is configured to measure a pressure of a measurement target fluid.

As shown in FIGS. 1 and 2, the physical quantity measuring device 1 includes a cylindrical case 2, a joint 3, a sensor module 4, a lid member 5, a circuit board 6, a signal transmitter 7, a holder 8, a cap member 9, and a sealing member 10.

Cylindrical Case 2

The cylindrical case 2, which is a metallic component in a form of a cylinder, includes a first opening 21 and a second opening 22 at a first end and a second end, respectively, in a direction along a center axis R.

A recess 23 in a form of a concave at a part of the cylindrical case 2 is provided on a circumferential surface of the cylindrical case 2. A through-hole 24 is formed at a bottom surface of the recess 23 of the cylindrical case 2. In other words, the through-hole 24 is provided in a circumferential portion of the cylindrical case 2.

A fitting ring 25, into which the lid member 5 is fitted, is provided to the second opening 22. A step portion 26 is provided inside the fitting ring 25.

Joint 3

The joint 3 is a metallic component disposed to cover the first opening 21 of the cylindrical case 2. In the present exemplary embodiment, the joint 3 is connected by welding to an end at the first opening 21 of the cylindrical case 2. It should be noted that the joint 3 is not necessarily welded to the cylindrical case 2 but is optionally screwed to the cylindrical case 2 to be attached.

The joint 3 is provided with an introduction port (not shown) for introducing a measurement target fluid. A first end of the joint 3 radially extends from the center to define a tool engagement portion 31 to be engaged with a tool (e.g. a spanner). An external thread 32 to be screwed to an attachment target (not shown) is formed at a second end of the joint 3. It should be noted that the second end of the joint 3, which defines the external thread 32 in the present exemplary embodiment, optionally defines, for instance, an internal thread. Alternatively, the second end of the joint 3 is optionally configured to be welded to be attached to the attachment target in some embodiments.

Sensor Module 4

The sensor module 4 includes a cylindrical portion 41 attached to the first end of the joint 3 and a diaphragm 42 integrally formed at a first end of the cylindrical portion 41.

A strain gauge (not shown) is formed on the diaphragm 42 and is configured to detect the pressure of the measurement target fluid introduced through the introduction port. The sensor module 4 is configured to output a detection signal to a later-described electronic circuit 62 in accordance with the detected pressure.

It should be noted that the sensor module 4 is not necessarily provided with the diaphragm 42 but is optionally, for instance, a so-called MEMS (Micro Electro Mechanical System) sensor. In other words, the sensor module 4 is designed in any manner as long as the pressure of the measurement target fluid is detectable.

Lid Member 5

Figure 3:
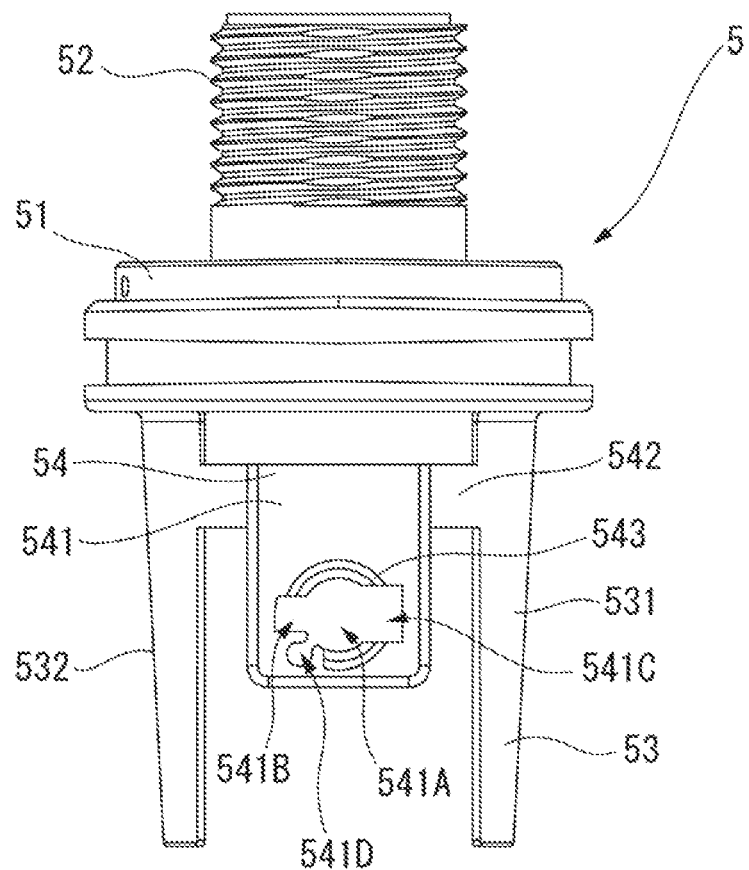
FIG. 3 is a front elevational view showing an outline of a lid member.

FIG. 3 is a front elevational view showing an outline of the lid member.

As shown in FIGS. 1 to 3, the lid member 5, which is a resin-made, so-called connector component, includes a lid body 51, a cylindrical portion 52, a circuit-board support 53, and an attachment target portion 54.

The lid body 51 is a disc-shaped component that is attached to the cylindrical case 2 by crimping the fitting ring 25. A communication hole (not shown) in communication with the cylindrical portion 52 is provided in a bottom surface of the lid body 51.

An inner circumferential surface of the cylindrical portion 52 defines an attachment hole 521 for receiving the signal transmitter 7. An outer circumferential surface of the cylindrical portion 52 is provided with an external thread.

The circuit-board support 53, which is a member for supporting the circuit board 6, projects from the lid body 51. In the present exemplary embodiment, the circuit-board support 53 includes a pair of a first support 531 and a second support 532. The first support 531 and the second support 532 of the circuit-board support 53 hold and support the circuit board 6.

The attachment target portion 54 is a component to which the cap member 9 is detachably attached. In the present exemplary embodiment, the attachment target portion 54 includes an attachment target portion body 541, a connecting portion 542, and an engaging protrusion 543.

The attachment target portion body 541 is a flat-plate component, which is connected to and supported by the first support 531 and the second support 532 via the connecting portion 542. The attachment target portion body 541 is provided with a shaft insertion hole 541A, a first-engagement-portion insertion hole 541B, a second-engagement-portion insertion hole 541C, a groove 541D, and an engagement target portion 541E (see FIG. 5).

The engaging protrusion 543 protrudes from the attachment target portion body 541 toward the through-hole 24 of the cylindrical case 2. In the present exemplary embodiment, the engaging protrusion 543 is inserted into the through-hole 24 to be engaged therewith. The position of the lid member 5 relative to the cylindrical case 2 is thus determined.

The shaft insertion hole 541A is configured so that a later-described cap member shaft 92 of the cap member 9 is insertable therein.

The first-engagement-portion insertion hole 541B is continuous with the shaft insertion hole 541A. The first-engagement-portion insertion hole 541B, whose shape corresponds to that of a later-described first engagement portion 931 of the cap member 9, is configured to receive the first engagement portion 931.

The second-engagement-portion insertion hole 541C, which is continuous with the shaft insertion hole 541A, is provided opposite the first-engagement-portion insertion hole 541B across the shaft insertion hole 541A. The second-engagement-portion insertion hole 541C, whose shape corresponds to that of a later-described second engagement portion 932 of the cap member 9, is configured to receive the second engagement portion 932. It should be noted that the first-engagement-portion insertion hole 541B and the second-engagement-portion insertion hole 541C define the engagement-portion insertion hole according to the present disclosure, which is continuous with the shaft insertion hole 541A.

The groove 541D is continuous with the shaft insertion hole 541A. In the present exemplary embodiment, the groove 541D is provided in communication with a point near the first-engagement-portion insertion hole 541B in the shaft insertion hole 541A. A later-described linear member 102 of the sealing member 10 is to be rested in the groove 5410.

The engagement target portion 541E (see FIG. 5) is engageable with the first engagement portion 931. The details of the engagement target portion 541E will be described later.

It should be noted that the attachment method of the cap member 9 and the sealing member 10 to the attachment target portion 54 will be detailed later.

Circuit Board 6

The circuit board 6 includes a board body 61, the electronic circuit 62, and an electronic adjuster 63.

The board body 61, which is a rectangular plate-shaped component in a plan view whose longitudinal direction extends along the center axis R of the cylindrical case 2, is provided with a wiring pattern (not shown) on a front side thereof. In the present exemplary embodiment, the board body 61 includes a first board 611 and a second board 612 that are disposed mutually in parallel. The first board 611 and the second board 612 are connected by a connecting body 613. The first board 611 and the second board 612 are held by the above-described circuit-board support 53 of the lid member 5 to be supported by the lid member 5.

Further, two engagement holes 612A are provided in the second board 612 in the present exemplary embodiment. Later-described engagement pieces 82 of the holder 8 are inserted into the engagement holes 612A to hold the circuit board 6 by the holder 8.

It should be noted that the board body 61 is not necessarily configured as described above. For instance, the board body 61 is optionally provided by a single board or, alternatively, three or more boards.

The electronic circuit 62, which is configured to receive the detection signal from the sensor module 4, is provided on the first board 611. The strain gauge of the sensor module 4 and the electronic circuit 62 are electrically connected through electric wires and the like (not shown).

The electronic adjuster 63, with which the electronic circuit 62 is configured to be adjusted, is provided on the first board 611 in a manner facing the circumferential surface of the cylindrical case 2.

In the present exemplary embodiment, the electronic adjuster 63 includes an operable portion 631 that functions as a trimmer. The operable portion 631 is provided at a position corresponding to the through-hole 24 in the cylindrical case 2. Accordingly, the operable portion 631 can be operated using a screwdriver or the like inserted through the through-hole 24, which can be exposed by detaching the cap member 9.

Signal Transmitter 7

The signal transmitter 7 includes a cylindrical member 71 and a plurality of terminals 72 provided in the cylindrical member 71. The terminals 72 are electrically connected to the circuit board 6 through electric wires and the like (not shown).

Holder 8

The holder 8 is a metallic component for holding the circuit board 6. In the present exemplary embodiment, the holder 8 includes a flat portion 81 and the engagement pieces 82. The flat portion 81 includes a first plate portion 81A and a second plate portion 81B.

The first plate portion 81A, whose outer shape corresponds to an inner circumferential surface of the fitting ring 25, is held between the step portion 26 of the cylindrical case 2 and the lid body 51 of the lid member 5.

Linear portions opposite an arc-shaped outer portion of the first plate portion 81A is in contact with respective side surfaces of the circuit-board support 53. The position of the holder 8 relative to the lid member 5 is thus determined.

The second plate portion 81B, which is integrated with the first plate portion 81A, is inserted between the pair of first support 531 and the second support 532 and between the lid body 51 and the circuit board 6. Further, the second plate portion 81B is provided with a window 81C. The window 81C is a space for inserting electric wires and the like for electrically connecting the terminals 72 and the circuit board 6.

The engagement pieces 82 are integrated with the first plate portion 81A. Two engagement pieces 82 are provided in the present exemplary embodiment. As described above, the engagement pieces 82 are inserted into respective engagement holes 612A of the circuit board 6, where the engagement pieces 82 are fixed, in the engagement holes 612A through soldering (not shown). The holder 8 thus holds the circuit board 6.

Cap Member 9

Figure 4:
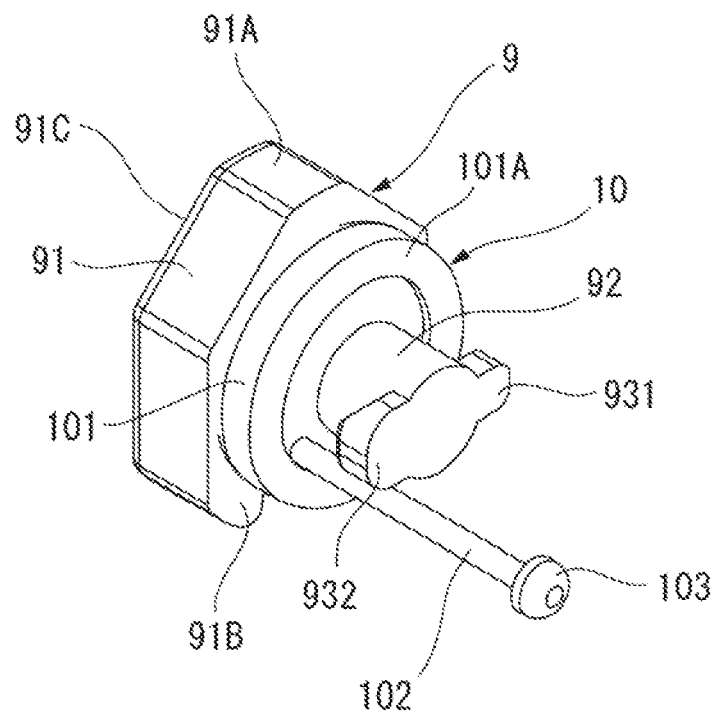
FIG. 4 is a perspective view showing an outline of a cap member and a sealing member.

FIG. 4 is a perspective view showing an outline of the cap member 9 and the sealing member 10.

As shown in FIGS. 1 to 4, the cap member 9 is a resin-made component that is attached to cover the through-hole 24. In the present exemplary embodiment, the cap member 9 is detachably attached to the attachment target portion 54 of the lid member 5. The cap member 9 includes a cap member body 91, a cap member shaft 92, and a cap member engagement portion 93.

The cap member body 91 is disposed outside the cylindrical case 2 to cover the through-hole 24 of the cylindrical case 2. More specifically, the cap member body 91 is disposed in the recess 23 of the cylindrical case 2.

Further, in the present exemplary embodiment, the cap member body 91, which is a pentagonal component having an apex 91A, includes a bottom surface 91B facing the cylindrical case 2 and a front surface 91C opposite the bottom surface 918.

The cap member shaft 92, which is a component integrated with the cap member body 91, extends from the bottom surface 91B of the cap member body 91. As described above, the cap member shaft 92 is insertable into the shaft insertion hole 541A of the attachment target portion 54.

The cap member engagement portion 93 extends from an end of the cap member shaft 92 in a radial direction of the cap member shaft 92. In the present exemplary embodiment, the cap member engagement portion 93 includes the first engagement portion 931 and the second engagement portion 932.

The first engagement portion 931, which is a quadratic prism component extending from the cap member shaft 92, is insertable into the above-described first-engagement-portion insertion hole 541B. Specifically, the first engagement portion 931 is sized slightly smaller than the first-engagement-portion insertion hole 541B.

The second engagement portion 932 is provided opposite the first engagement portion 931 across the cap member shaft 92. In the present exemplary embodiment, the second engagement portion 932, which is a quadratic prism component extending from the cap member shaft 92, is insertable into the above-described second-engagement-portion insertion hole 5410. Specifically, the second engagement portion 932 is sized slightly smaller than the second-engagement-portion insertion hole 541C.

Further, the second engagement portion 932 is slightly larger than the first engagement portion 931 in the present exemplary embodiment. In other words, the first engagement portion 931 and the second engagement portion 932 are of different sizes.

In the present exemplary embodiment, when the apex 91A of the cap member body 91 protrudes upward (i.e. vertically protrudes), the first engagement portion 931 and the second engagement portion 932, which extend horizontally with respect to the cap member shaft 92, are insertable into the first-engagement-portion insertion hole 541B and the second-engagement-portion insertion hole 541C, respectively. In other words, when the apex 91A of the cap member body 91 vertically protrudes, the cap member 9 can be attached to/detached from the attachment target portion 54 of the lid member 5.

On the other hand, when the apex 91A of the cap member body 1 protrudes laterally (i.e. horizontally), the first engagement portion 931 and the second engagement portion 932 extend vertically with respect to the cap member shaft 92 to be engaged with the attachment target portion 54 of the lid member 5. In other words, when the apex 91A of the cap member body 91 horizontally protrudes, the cap member 9 cannot be detached from the attachment target portion 54 of the lid member 5.

It should be noted that the orientation of the cap member 9 when the apex 91A vertically protrudes is an example of a first orientation of the invention, and the orientation of the cap member 9 when the apex 91A horizontally protrudes is an example of a second orientation of the invention.

Sealing Member 10

The sealing member 10 is a component for providing a seal between the through-hole 24 of the cylindrical case 2 and the cap member body 91 of the cap member 9. The sealing member 10, which is a component made of rubber or an elastic synthetic resin, is attached to the cap member 9. In the present exemplary embodiment, the sealing member 10 includes a sealing member body 101, a linear member 102, and a sealing-member engagement portion 103.

The sealing member body 101 is annularly shaped and disposed to surround the cap member shaft 92. In the present exemplary embodiment, the sealing member body 101 is provided with a projection 101A projecting toward the cylindrical case 2 along the periphery thereof. The sealing member body 101, when being placed between the cap member body 91 and the cylindrical case 2, provides a seal between the cap member body 91 and the through-hole 24 through an elastic deformation of the projection 101A.

The linear member 102 is a stick-shaped component extending from the cap member body 91 toward the cylindrical case 2. The linear member 102 is inserted into the above-described groove 541D of the attachment target portion body 541.

The sealing-member engagement portion 103 is provided at an end of the linear member 102. In the present exemplary embodiment, the sealing-member engagement portion 103 is substantially hemispherical.

Attachment Method of Cap Member 9 and Sealing Member 10

Next, an attachment method of the cap member 9 and the sealing member 10 will be described.

Figure 5:
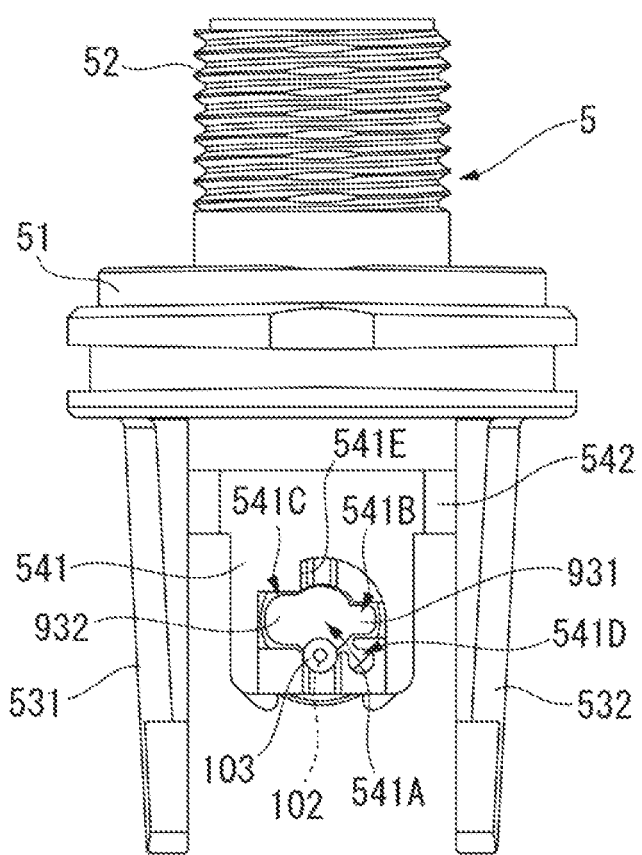
FIG. 5 is an illustration showing an attachment step of the cap member and the sealing member.
Figure 6:
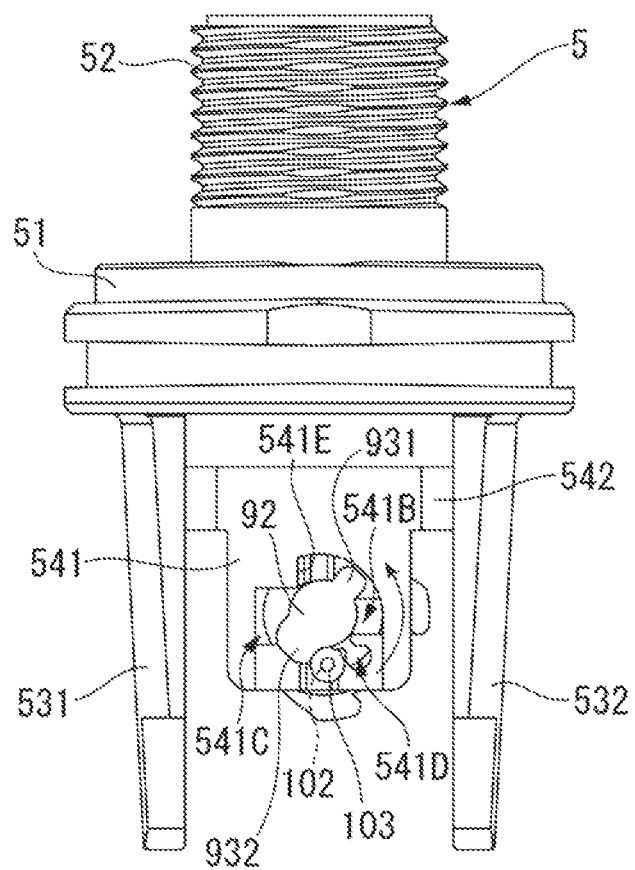
FIG. 6 is an illustration showing another attachment step of the cap member and the sealing member.
Figure 7:
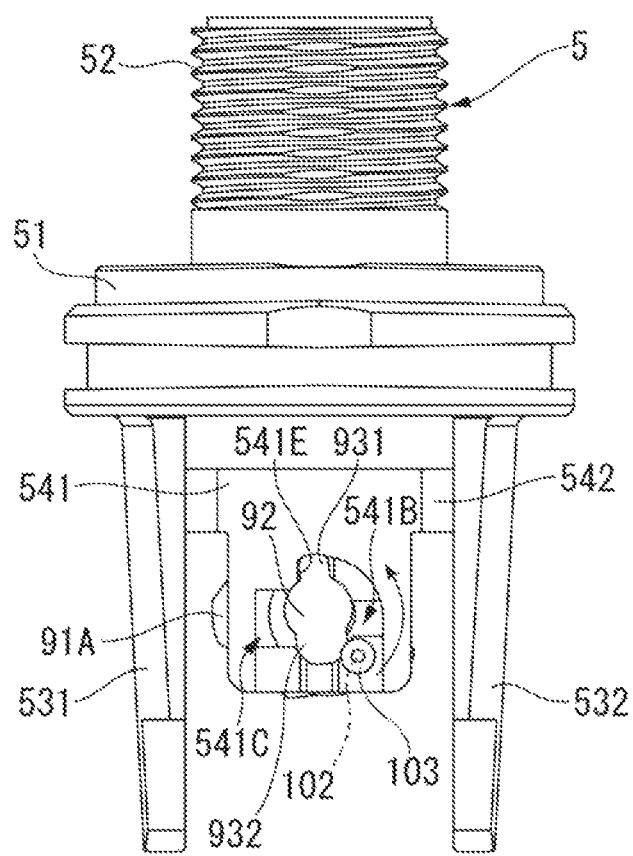
FIG. 7 is an illustration showing still another attachment step of the cap member and the sealing member.

FIGS. 5 to 7 illustrate attachment steps of the cap member 9 and the sealing member 10. It should be noted that the cylindrical case 2, the circuit board 6, and the like are omitted in FIGS. 5 to 7 in order to clearly show the relevant components. It should also be noted that, in FIGS. 5 to 7, the lid member 5 is viewed in a direction opposite to that in FIG. 3.

Initially, the cylindrical case 2 is assembled. In other words, the physical quantity measuring device 1 is assembled except for the cap member 9 and the sealing member 10. Then, after the cap member body 91 is oriented so that the apex 91A vertically protrudes as shown in FIG. 5, the cap member shaft 92, the first engagement portion 931, and the second engagement portion 932 are inserted into the shaft insertion hole 541A, the first-engagementportion insertion hole 541B, and the second-engagement-portion insertion hole 541C, respectively.

Further, the linear member 102 and the sealing-member engagement portion 103 are inserted into the shaft insertion hole 541A. Specifically, the sealing member 10 is attached to the cap member 9 so that the linear member 102 and the sealing-member engagement portion 103 are located in a region counterclockwise with respect to the second engagement portion 932 as viewed in an axial direction of the cap member shaft 92.

Next, as shown in FIG. 6, the cap member 9 is rotated in a counterclockwise direction around the cap member shaft 92. Then, being biased by the second engagement portion 932, the linear member 102 and the sealing-member engagement portion 103 move in the counterclockwise direction. It should be noted that the counterclockwise direction is an example of a rotation direction of the invention.

Subsequently, when the cap member 9 is further rotated in the counterclockwise direction as shown in FIG. 7, with the apex 91A of the cap member body 91 being directed in the horizontal direction, the first engagement portion 931 is engaged with the engagement target portion 541E. The rotation of the cap member 9 in the counterclockwise direction is thus restricted. As described above, at this time, the first engagement portion 931 and the second engagement portion 932 are engaged with the attachment target portion 54. Accordingly, the cap member 9 does not fall off from the attachment target portion 54 in this state. In sum, the cap member 9 is pivotally supported by the attachment target portion 54 so that the cap member 9 is rotatable between an orientation for the apex 91A to vertically protrude and an orientation for the apex 91A to horizontally protrude.

It should be noted that when the cap member 9 is rotated in the counterclockwise direction so that the first engagement portion 931 is engaged with the engagement target portion 541E as shown in FIG. 7, the linear member 102, being biased by the second engagement portion 932, is received in the groove 541D. The sealing member 10 is thus attached to the attachment target portion 54. As described above, the cap member 9 and the sealing member 10 in the present exemplary embodiment can be attached after the cylindrical case 2 is assembled.

Even when the cap member 9 is rotated in a clockwise direction in this state, the linear member 102, which is rested in the groove 541D, is not biased to be moved by the first engagement portion 931 or the second engagement portion 932. In other words, even when the cap member 9 is rotated to the orientation for the apex 91A to vertically protrude or the orientation for the apex 91A to horizontally protrude, the sealing member 10 is not detached from the attachment target portion 54.

Figure 8:
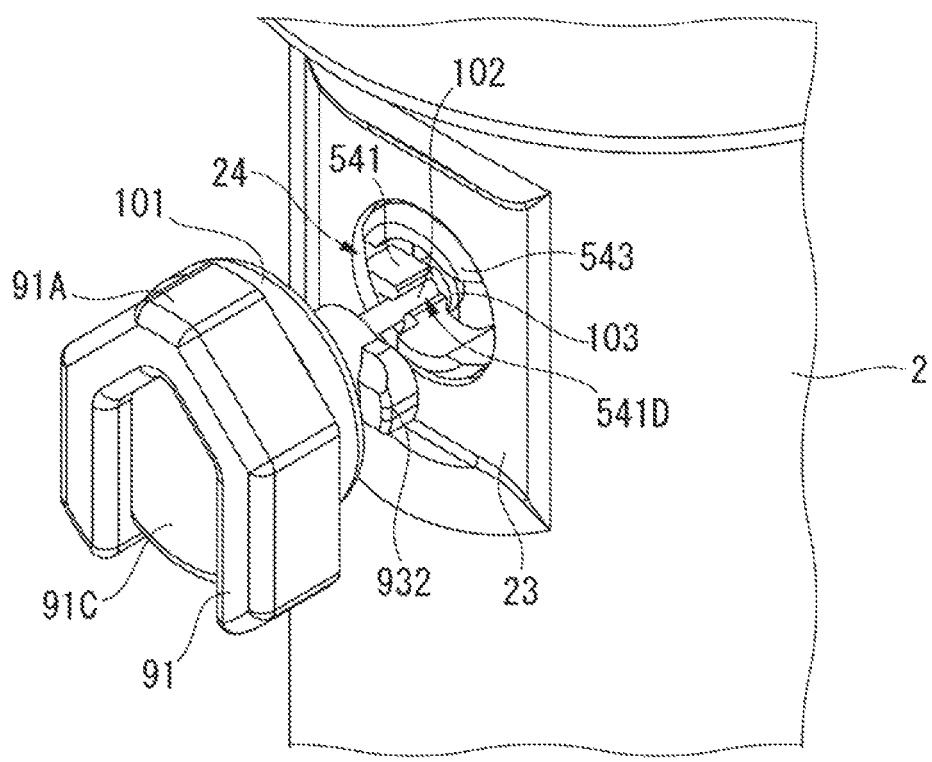
FIG. 8 is an illustration showing how the sealing member is attached.

FIG. 8 is an illustration showing how the sealing member 10 is attached.

As shown in FIG. 8, by rotating the cap member 9 to the orientation for the apex 91A to vertically protrude, the first engagement portion 931 and the second engagement portion 932 can be detached from the attachment target portion 54. In this state, since the linear member 102 is rested in the groove 541D, the sealing-member engagement portion 103 is engaged with the attachment target portion 54. Thus, even when the cap member 9 is detached from the attachment target portion 54, the sealing member 10 is kept from being detached from the attachment target portion 54. Accordingly, the cap member 9 attached with the sealing member 10 is prevented from being lost when the cap member 9 is detached.

It should be noted that, since the cap member body 91 is a pentagonal component having the apex 91A in the present exemplary embodiment, the orientation of the first engagement portion 931 and the second engagement portion 932 can be easily recognized. In other words, a user can easily recognize whether the cap member 9 is detachable by checking the orientation of the cap member body 91.

The following advantages can be achieved by the above-described present exemplary embodiment.

(1) In the present exemplary embodiment, the cap member 9 includes: a cap member body 91 disposed outside the cylindrical case 2 and configured to cover the through-hole 24; the cap member shaft 92 extending from the bottom surface 91B of the cap member body 91; and the first engagement portion 931 and the second engagement portion 932 extending from the end of the cap member shaft 92 in the radial direction of the cap member shaft 92. The sealing member 10 includes: the annularly shaped sealing member body 101 surrounding the cap member shaft 92; the linear member 102 extending from the sealing member body 101; and the sealing-member engagement portion 103 provided to the end of the linear member 102. The attachment target portion 54, into which the cap member 9 is detachably attached, includes: the shaft insertion hole 541A configured to receive the cap member shaft 92; the first-engagement-portion insertion hole 541B configured to receive the first engagement portion 931 and continuous with the shaft insertion hole 541A; the second-engagement-portion insertion hole 541C configured to receive the second engagement portion 932 and continuous with the shaft insertion hole 541A; and the groove 541D, in which the linear member 102 is to be rested. Thus, in the orientation for the apex 91A to vertically protrude, the first engagement portion 931 and the second engagement portion 932 of the cap member 9 are insertable into the first-engagement-portion insertion hole 5416 and the second-engagement-portion insertion hole 541C, respectively. The first engagement portion 931 and the second engagement portion 932 of the cap member 9 are engaged with the attachment target portion 54 in the orientation for the apex 91A to horizontally protrude (i.e. the second orientation). The cap member 9 is thus detachably attached to the attachment target portion 54.

In the orientation for the apex 91A to vertically protrude (i.e. the first orientation), the linear member 102 is located in a region counterclockwise with respect to the second engagement portion 932 as viewed in the axial direction of the cap member shaft 92. Accordingly, with the cap member 9 being situated in the orientation for the apex 91A to vertically protrude, by inserting the cap member shaft 92 and the linear member 102 into the shaft insertion hole 541A and subsequently rotating the cap member 9 in the counterclockwise direction, the linear member 102 is biased by the second engagement portion 932 to rotate in the counterclockwise direction. Then, while moving in the counterclockwise direction, the linear member 102, which is guided into the groove 541D of the attachment target portion 54, can be received in the groove 541D. Accordingly, when the cap member 9 is to be attached after assembling the cylindrical case 2, the linear member 102 for preventing the loss of the cap member 9 can be attached to the attachment target portion 54 located inside the cylindrical case 2. Thus, even if the linear member 102 is damaged after the cylindrical case 2 is assembled, the sealing member 10 having the linear member 102 can be easily exchanged.

(2) In the present exemplary embodiment, the engaging protrusion 543 of the attachment target portion 54 can be engaged with the through-hole 24, so that the position of the attachment target portion 54 with respect to the through-hole 24 can be easily determined. Thus, the physical quantity measuring device 1 can be easily assembled.

(3) In the present exemplary embodiment, the cap member engagement portion 93, which includes the first engagement portion 931 and the second engagement portion 932, can be reliably engaged with the attachment target portion 54. Accordingly, the cap member 9 is restrained from falling off from the attachment target portion 54.

(4) In the present exemplary embodiment, the pentagonal shape of the cap member body 91 allows a user to easily recognize whether the cap member 9 is in the first orientation or in the second orientation.

Second Exemplary Embodiment

Next, a second exemplary embodiment of the invention will be described below with reference to the attached drawings.

The second exemplary embodiment is different from the first exemplary embodiment in that: a sealing member 10A includes a linear member 106A and a sealing-member engagement shaft 107A provided to an end of the linear member 106A and oriented in a direction intersecting the linear member 106A; and that an attachment target portion 54A is provided with an engagement-shaft insertion hole 541J capable of receiving the sealing-member engagement shaft 107A. It should be noted that components in the second exemplary embodiment that are the same as or similar to those in the first exemplary embodiment are denoted by the same reference numerals to omit detailed description thereof.

Lid Member 5A

Figure 9:
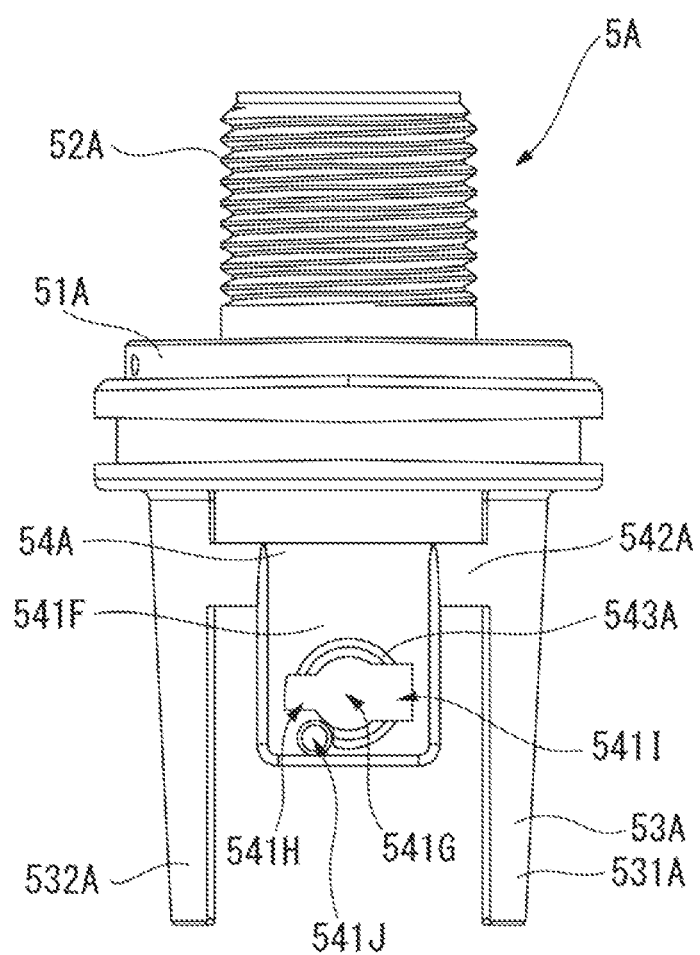
FIG. 9 is a front elevational view showing an outline of a lid member according to a second exemplary embodiment.

FIG. 9 is a front elevational view showing an outline of a lid member 5A according to the present exemplary embodiment.

As shown in FIG. 9, the lid member 5A, which is a resin-made, so-called connector component as in the lid member 5 according to the above-described first exemplary embodiment, includes a lid body 51A, a cylindrical portion 52A, a circuit-board support 53A, and the attachment target portion 54A.

It should be noted that the lid body 51A, the cylindrical portion 52A, and the circuit-board support 53A, which are respectively the same as the lid body 51, the cylindrical portion 52, and the circuit-board support 53 in the above-described first exemplary embodiment, will not be detailed below.

As in the attachment target portion 54 in the first exemplary embodiment, the attachment target portion 54A is a component on which the cap member 9 is detachably attached. In the present exemplary embodiment, the attachment target portion 54A includes an attachment target portion body 541F, a connecting portion 542A, and an engaging protrusion 543A. The connecting portion 542A and the engaging protrusion 543A, which are respectively the same as the connecting portion 542 and the engaging protrusion 543 in the above-described first exemplary embodiment, will not be detailed below.

The attachment target portion body 541F is a flat-plate component, which is connected to and supported by the first support 531A and the second support 532A via the connecting portion 542A. The attachment target portion body 541F is provided with a shaft insertion hole 541G, a first-engagement-portion insertion hole 541H, a second-engagement-portion insertion hole 541I, and an engagement-shaft insertion hole 541J. It should be noted that, as in the above-described first exemplary embodiment, the attachment target portion body 541F is provided with the engagement target portion 541E (see FIG. 13).

The shaft insertion hole 541G is configured to receive the cap member shaft 92 of the cap member 9 as in the first exemplary embodiment.

The first-engagement-portion insertion hole 541H is continuous with the shaft insertion hole 541G. The first-engagement-portion insertion hole 541H, whose shape corresponds to that of the first engagement portion 931 of the cap member 9, is configured to receive the first engagement portion 931.

The second-engagement-portion insertion hole 541I, which is continuous with the shaft insertion hole 541G, is provided opposite the first-engagement-portion insertion hole 541H across the shaft insertion hole 541G. The second-engagement-portion insertion hole 541I, whose shape corresponds to that of the second engagement portion 932 of the cap member 9, is configured to receive the second engagement portion 932. It should be noted that the first-engagement-portion insertion hole 541H and the second-engagement-portion insertion hole 541I define the engagement-portion insertion hole according to the present disclosure, which is continuous with the shaft insertion hole 541G.

The engagement-shaft insertion hole 541J is independent of (i.e. discontinuous with) the shaft insertion hole 541G. The sealing-member engagement shaft 107A is insertable into the engagement-shaft insertion hole 541J, in which the later-described linear member 106A of the sealing member 10A is to be received.

It should be noted that the attachment method of the cap member 9 and the sealing member 10A to the attachment target portion 54A will be detailed later.

Sealing Member 10A

Figure 10:
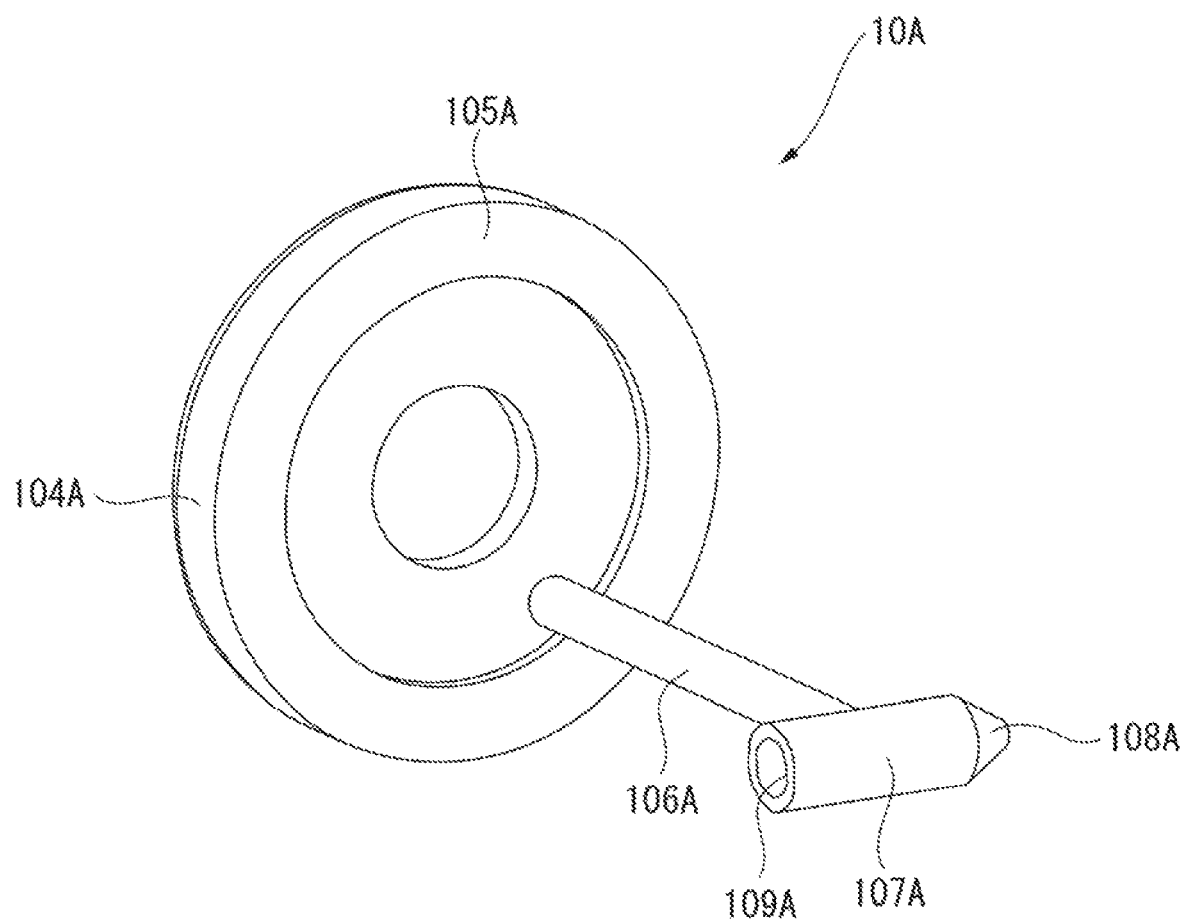
FIG. 10 is a perspective view showing an outline of a sealing member according to the second exemplary embodiment.

FIG. 10 is a front elevational view showing an outline of the sealing member 10A according to the present exemplary embodiment.

As shown in FIG. 10, the sealing member 10A is a component configured to provide a seal between the through-hole 24 of the cylindrical case 2 and the cap member body 91 of the cap member 9 as in the sealing member 10 according to the above-described first exemplary embodiment. The sealing member 10A, which is a component made of rubber or an elastic synthetic resin, is attached to the cap member 9. In the present exemplary embodiment, the sealing member 10A includes a sealing member body 104A, the linear member 106A, and the sealing-member engagement shaft 107A.

The sealing member body 104A is annularly shaped and disposed to surround the cap member shaft 92. In the present exemplary embodiment, a projection 105A projecting toward the cylindrical case 2 is provided along a periphery of the sealing member body 104A. When being placed between the cap member body 91 and the cylindrical case 2, the sealing member body 104A provides a seal between the cap member body 91 and the through-hole 24 by an elastic deformation of the projection 105A.

The linear member 106A is a stick-shaped component extending from the cap member body 91 toward the cylindrical case 2. The linear member 106A is received in the above-described engagement-shaft insertion hole 541J of the attachment target portion body 541F.

The sealing-member engagement shaft 107A, which is provided to an end of the linear member 106A, extends in a direction orthogonal to the linear member 106A. In other words, the linear member 106A and the sealing-member engagement shaft 107A are arranged in a T-shape. In the present exemplary embodiment, the sealing-member engagement shaft 107A is provided with a projection 108A and a dent 109A.

The projection 108A, which is provided at a first end of the sealing-member engagement shaft 107A, is tapered toward a tip end. In other words, the projection 108A is conical.

The dent 109A, which is provided at a second end of the sealing-member engagement shaft 107A, extends along an axial direction of the sealing-member engagement shaft 107A. A tool (e.g. a screwdriver) is insertable into the dent 109A.

Attachment Method of Cap Member 9 and Sealing Member 10A

Next, an attachment method of the cap member 9 and the sealing member 10A will be described below.

FIGS. 11 to 14 are illustrations showing attachment steps of the cap member 9 and the sealing member 10A. It should be noted that the cylindrical case 2, the circuit board 6, and the like are omitted in FIGS. 11 to 14 in order to clearly show the relevant components. It should also be noted that the lid member 5A is viewed in FIGS. 13 and 14 in a direction opposite to that in FIG. 9.

Figure 11:
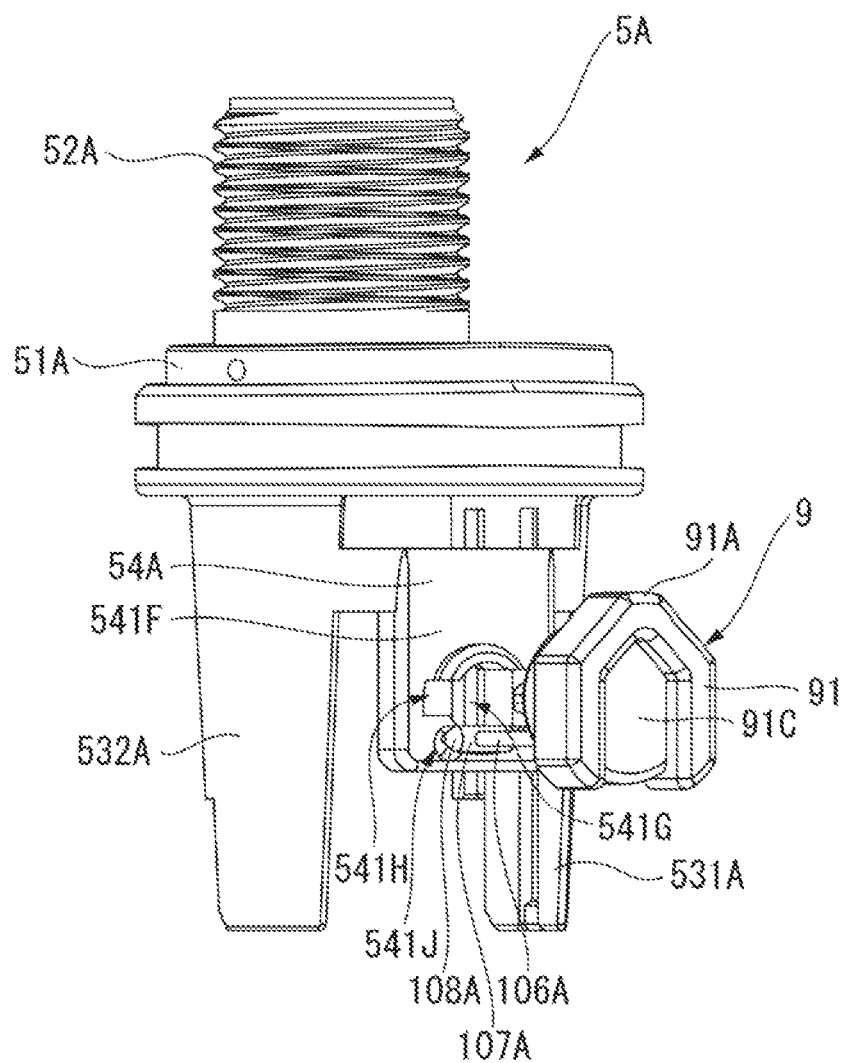
FIG. 11 is an illustration showing an attachment step of a cap member and the sealing member.

Initially, the cylindrical case 2 is assembled as in the first exemplary embodiment. Then, with the cap member body 91 being arranged so that the apex 91A vertically protrudes as shown in FIG. 11, the projection 108A of the sealing-member engagement shaft 107A is located at a position corresponding to the engagement-shaft insertion hole 541J.

Figure 12:
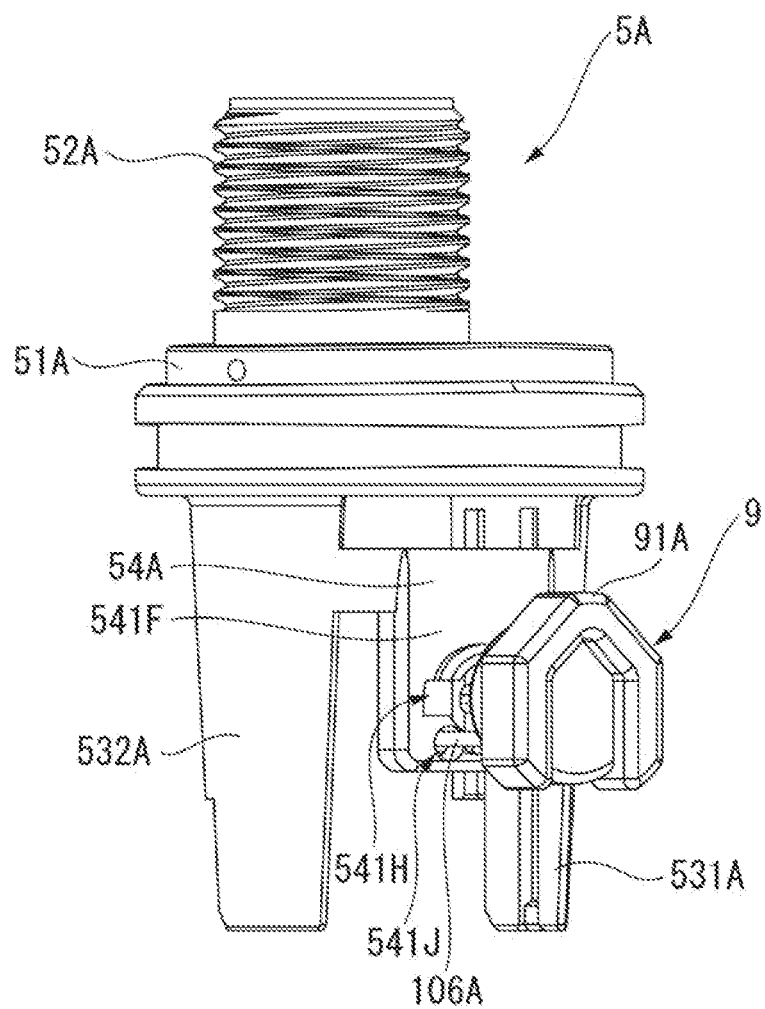
FIG. 12 is an illustration showing another attachment step of the cap member and the sealing member.

Subsequently, as shown in FIG. 12, the sealing-member engagement shaft 107A is inserted from the projection 108A into the engagement-shaft insertion hole 541J. At this time, the projection 108A is inserted into the engagement-shaft insertion hole 541J using a tool such as a screwdriver inserted into the dent 109A of the sealing-member engagement shaft 107A. The sealing-member engagement shaft 107A thus can be easily inserted into the engagement-shaft insertion hole 541J.

Figure 13:
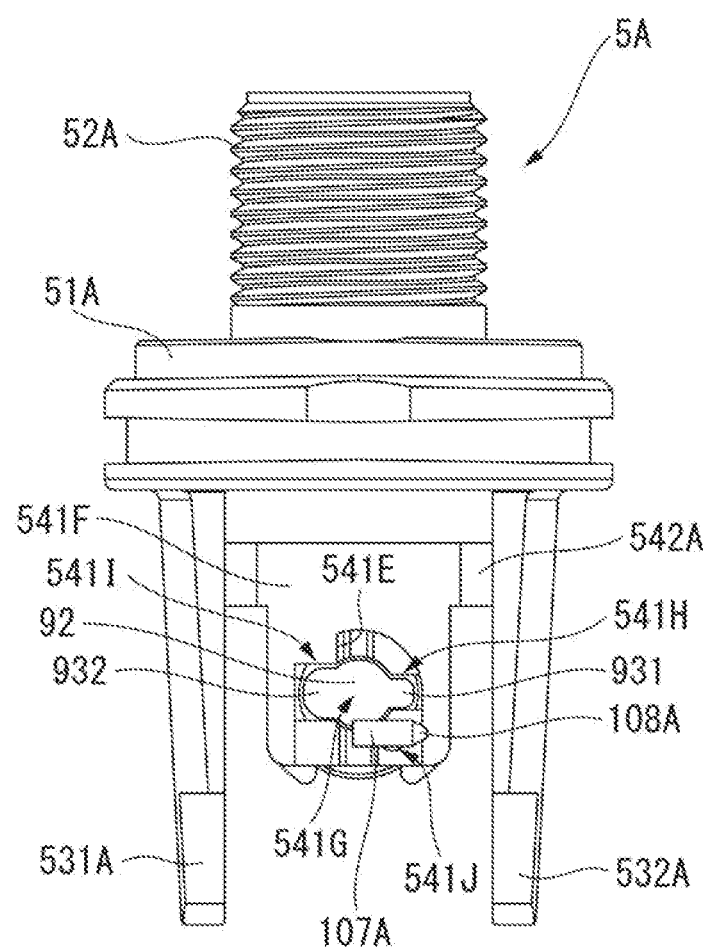
FIG. 13 is an illustration showing still another attachment step of the cap member and the sealing member.

Subsequently, as shown in FIG. 13, the cap member shaft 92, the first engagement portion 931, and the second engagement portion 932 are inserted into the shaft insertion hole 541G, the first-engagement-portion insertion hole 541H, and the second-engagement-portion insertion hole 541I, respectively.

Figure 14:
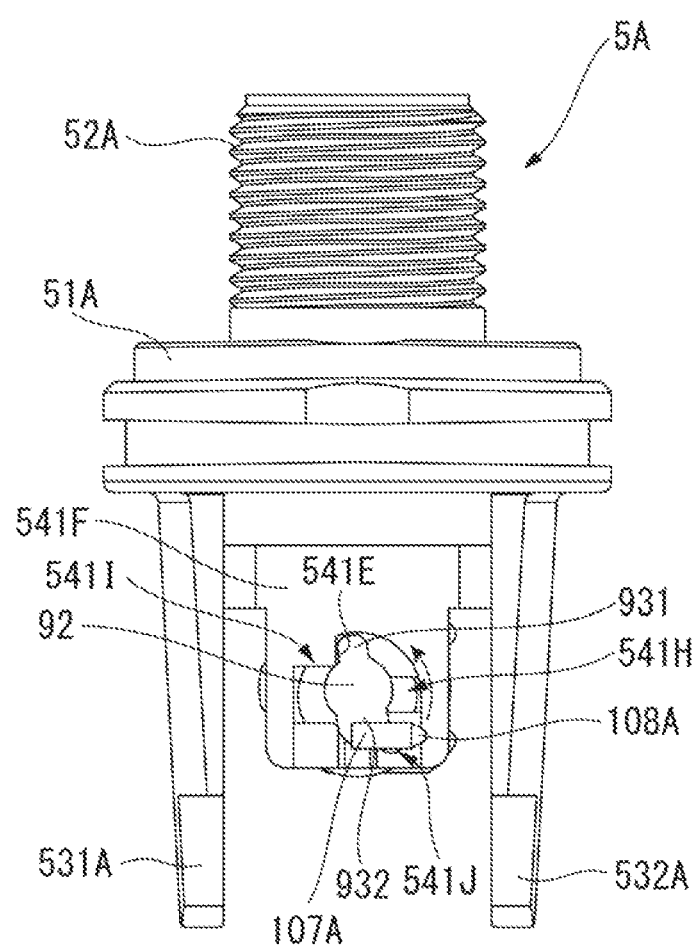
FIG. 14 is an illustration shoving a further attachment step of the cap member and the sealing member.

Next, the cap member 9 is rotated around the cap member shaft 92 in the counterclockwise direction as shown in FIG. 14. Then, with the apex 91A of the cap member body 91 being horizontally directed, the first engagement portion 931 is engaged with the engagement target portion 541E. The rotation of the cap member 9 in the counterclockwise direction is thus restricted. At this time, the first engagement portion 931 and the second engagement portion 932 are engaged with the attachment target portion 54A as in the above-described first exemplary embodiment. Thus, the cap member 9 does not fall off from the attachment target portion 54A in this state. In sum, the cap member 9 is pivotally supported by the attachment target portion 54A so that the cap member 9 is rotatable between the orientation for the apex 91A to vertically protrude and the orientation for the apex 91A to horizontally protrude.

As described above, in the present exemplary embodiment, the cap member 9 and the sealing member 10A can be attached after the cylindrical case 2 is assembled.

Figure 15:
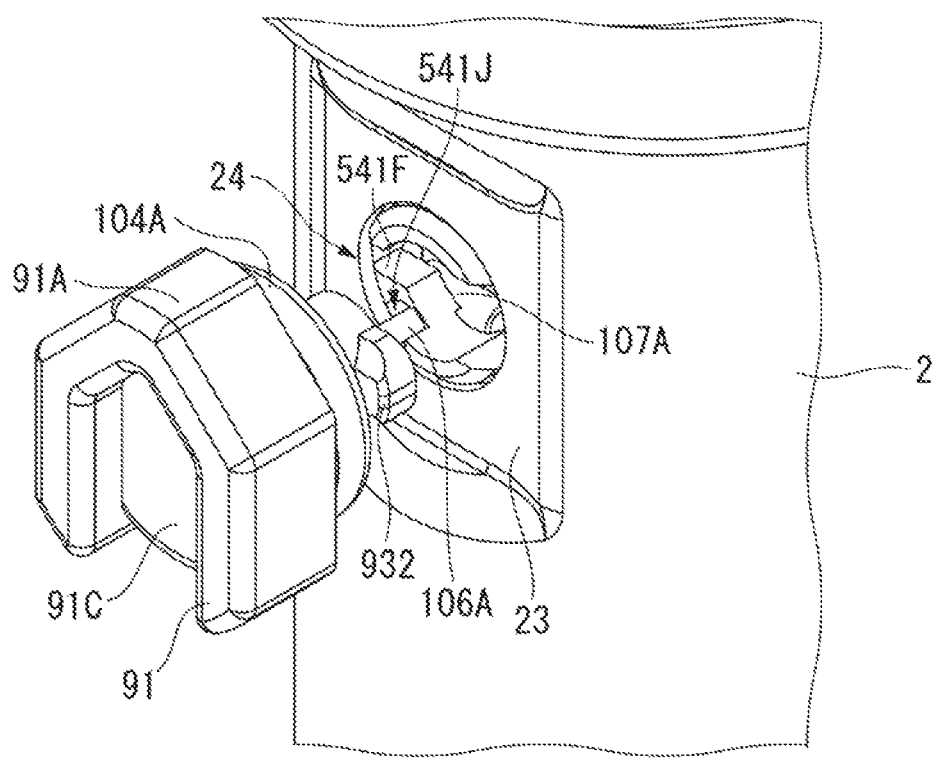
FIG. 15 is an illustration showing how the sealing member is attached.

FIG. 15 is an illustration showing how the sealing member 10A is attached.

As shown in FIG. 15, by rotating the cap member 9 so that the cap member 9 takes the orientation for the apex 91A to vertically protrude, the first engagement portion 931 and the second engagement portion 932 can be detached from the attachment target portion 54A. Since the linear member 106A is rested in the engagement-shaft insertion hole 541J in this state, the sealing-member engagement shaft 107A is engaged with the attachment target portion 54A. Thus, even when the cap member 9 is detached from the attachment target portion 54A, the sealing member 10A is kept from being detached from the attachment target portion 54A. Accordingly, when the cap member 9 is detached, the cap member 9 attached with the sealing member 10A can be prevented from being lost.

The following advantages can be achieved by the above-described present exemplary embodiment.

(5) In the present exemplary embodiment, the cap member 9 includes the cap member body 91 disposed outside the cylindrical case 2 to cover the through-hole 24, the cap member shaft 92 extending from the bottom surface 91B of the cap member body 91, and the first engagement portion 931 and the second engagement portion 932 extending from the end of the cap member shaft 92 in the radial direction of the cap member shaft 92. The sealing member 10A includes the annularly-shaped sealing member body 104A surrounding the cap member shaft 92, the linear member 106A extending from the sealing member body 104A, and the sealing-member engagement shaft 107A provided to an end of the linear member 106A and extending in a direction orthogonal to the linear member 106A. The attachment target portion 54A into which the cap member 9 is detachably attached, includes: the shaft insertion hole 541G configured to receive the cap member shaft 92; the first-engagement-portion insertion hole 541H configured to receive the first engagement portion 931 and continuous with the shaft insertion hole 541G; the second-engagement-portion insertion hole 541I configured to receive the second engagement portion 932 and continuous with the shaft insertion hole 541G; and the engagement-shaft insertion hole 541J, in which the linear member 106A is rested and the sealing-member engagement shaft 107A is insertable. The cap member engagement portion 93 of the cap member 9 is insertable into the shaft insertion hole 541G in the orientation for the apex 91A to vertically protrude (i.e. the first orientation). The first engagement portion 931 and the second engagement portion 932 of the cap member 9 are engaged with the attachment target portion 54A in the orientation for the apex 91A to horizontally protrude (i.e. the second orientation). In other words, the cap member 9 is detachably attached to the attachment target portion 54A.

The attachment target portion 54A is provided with the engagement-shaft insertion hole 541J, into which the sealing-member engagement shaft 107A is insertable. Thus, the sealing member 10A can be attached to the attachment target portion 54A by initially inserting the sealing-member engagement shaft 107A into the engagement-shaft insertion hole 541J and subsequently resting the linear member 106A in the engagement-shaft insertion hole 541J. At this time, since the linear member 106A is orthogonal to the sealing-member engagement shaft 107A, after the linear member 106A is rested in the engagement-shaft insertion hole 541J, the sealing-member engagement shaft 107A is engaged with the attachment target portion 54A. Specifically, even when the linear member 106A is pulled in a direction for detaching the sealing member 10A, the sealing-member engagement shaft 107A is not easily detached from the attachment target portion 54A. Accordingly, the loss of the cap member 9 can be prevented by attaching the sealing member 10A, to which the cap member 9 is attached, to the attachment target portion 54A through the above process.

In other words, even when the cap member 9 is to be attached after assembling the cylindrical case 2, the linear member 106A for preventing the loss of the cap member 9 can be attached to the attachment target portion 54A located within the cylindrical case 2. Thus, even if the linear member 106A is damaged after assembling the cylindrical case 2, the sealing member 10A having the linear member 106A can be easily exchanged.

(6) In the present exemplary embodiment, the projection 108A of the sealing-member engagement shaft 107A can be inserted into the engagement-shaft insertion hole 541J using a tool such as a screwdriver inserted into the dent 109A of the sealing-member engagement shaft 107A. The sealing-member engagement shaft 107A thus can be easily inserted into the engagement-shaft insertion hole 541J, Modifications It should be noted that the present invention is not limited to the above-described embodiments but includes modifications, improvements, and the like as long as an object of the invention can be achieved.

The cylindrical case 2, which is a cylindrical component in the above exemplary embodiments, is not necessarily cylindrical. For instance, the cylindrical case is in form of a polygonal cylinder in some embodiments.

The cylindrical case 2, the joint 3, and the holder 8, which are made of metal in the above exemplary embodiments, are not necessarily metallic but are made of, for instance, a resin(s) in some embodiments.

The cap member 9, which is rotatable in the counterclockwise direction as viewed in the axial direction of the cap member shaft 92 from the orientation for the apex 91A to vertically protrude to the orientation for the apex 91A to horizontally protrude in the above-described exemplary embodiments, is not necessarily thus arranged. For instance, the cap member 9 is rotatable in a clockwise direction as viewed in the axial direction of the cap member shaft 92 from the orientation for the apex 91A to vertically protrude to the orientation for the apex 91A to horizontally protrude in some embodiments.

The cap member body 91, which is a pentagonal component having the apex 91A in the above exemplary embodiments, is not necessarily pentagonal. For instance, the cap member body is a quadrangular or triangular component in some embodiments. Additionally, the cap member body is provided with a mark indicating the orientation of the first engagement portion and the second engagement portion in some embodiments.

The first engagement portion 931 and the second engagement portion 932, which are differently sized in the above exemplary embodiments, are not necessarily thus designed. For instance, the first engagement portion and the second engagement portion are optionally of the same size.

The attachment target portions 54, 54A, which include the engaging protrusions 543, 543A protruding toward and engaging with the through-hole 24 in the above exemplary embodiments, are not necessarily thus designed. For instance, the attachment target portion according to the invention is optionally not provided with the engaging protrusion.

The sealing-member engagement portion 103, which is hemispherical in the first exemplary embodiment, is not necessarily hemispherical. For instance, the sealing-member engagement portion, which is a plate-shaped portion in some embodiments, is designed in any manner as long as being engageable with the attachment target portion.

The sealing-member engagement shaft 107A, which is provided to the end of the linear member 106A and extends in a direction orthogonal to the linear member 106A in the second exemplary embodiment, is not necessarily thus designed. The sealing-member engagement shaft only needs to extend in a direction intersecting the linear member. Specifically, the sealing-member engagement shaft only needs to be engageable with the attachment target portion when the linear member is rested in the engagement-shaft insertion hole.

The physical quantity measuring device 1, which is configured to measure a pressure of the measurement target fluid, is configured to measure, for instance, a differential pressure or temperature in some embodiments.

What is claimed is:

1. A physical quantity measuring device comprising:
   a cylindrical case whose circumferential portion is provided with a through-hole;
   a sensor module housed in the cylindrical case and configured to detect a physical quantity;
   a joint attached with the sensor module, the joint being disposed to cover a first opening of the cylindrical case;
   a lid member disposed to cover a second opening of the cylindrical case;
   a circuit board comprising an electronic circuit configured to receive a signal detected by the sensor module and an electronic adjuster configured to adjust the electronic circuit, the circuit board being housed in the cylindrical case;
   a cap member configured to be attached to cover the through-hole; and
   a sealing member configured to provide a seal between the through-hole and the cap member, wherein
   the electronic adjuster comprises an operable portion disposed at a position corresponding to the through-hole,
   the lid member comprises a circuit-board support supporting the circuit board and an attachment target portion for the cap member to be detachably attached,
   the cap member comprises a cap member body disposed outside the cylindrical case and configured to cover the through-hole, a cap member shaft extending from a bottom surface of the cap member body, and a cap member engagement portion extending from an end of the cap member shaft in a radial direction of the cap member shaft,
   the sealing member comprises an annularly-shaped sealing member body surrounding the cap member shaft, a linear member extending from the sealing member body, and a sealing-member engagement portion provided at an end of the linear member,
   the attachment target portion comprises: a shaft insertion hole into which the cap member shaft is insertable; an engagement-portion insertion hole into which the cap member engagement portion is insertable, the engagement-portion insertion hole being continuous with the shaft insertion hole; and a groove in which the linear member is rested, the groove being continuous with the shaft insertion hole,
   the cap member is pivotally supported by the attachment target portion to be rotatable to take a first orientation and a second orientation, the cap member engagement portion being insertable into the engagement-portion insertion hole in the first orientation and engageable with the attachment target portion in the second orientation, and in the first orientation, the linear member is located in a region in a rotation direction from the first orientation to the second orientation with respect to the cap member engagement portion as viewed in a direction of the cap member shaft.

2. The physical quantity measuring device according to claim 1, wherein
the attachment target portion is provided with an engaging protrusion protruding toward the through-hole and engageable with the through-hole.

3. The physical quantity measuring device according to claim 1, wherein
the cap member engagement portion comprises a first engagement portion and a second engagement portion provided opposite the first engagement portion across the cap member shaft, the second engagement portion being sized differently from the first engagement portion, and
the engagement-portion insertion hole comprises a first-engagement-portion insertion hole corresponding to the first engagement portion and a second-engagement-portion insertion hole corresponding to the second engagement portion, the second-engagement-portion insertion hole being provided opposite the first-engagement-portion insertion hole across the shaft insertion hole.

4. The physical quantity measuring device according to claim 1, wherein
the cap member body is pentagonal.

5. A physical quantity measuring device comprising:
a cylindrical case whose circumferential portion is provided with a through-hole;
a sensor module housed in the cylindrical case and configured to detect a physical quantity;
a joint attached with the sensor module, the joint, being disposed to cover a first opening of the cylindrical case;
a lid member disposed to cover a second opening of the cylindrical case;
a circuit board comprising an electronic circuit configured to receive a signal detected by the sensor module and an electronic adjuster configured to adjust the electronic circuit, the circuit board being housed in the cylindrical case;
a cap member configured to be attached to cover the through-hole; and
a sealing member configured to provide a seal between the through-hole and the cap member, wherein
the electronic adjuster comprises an operable portion disposed at a position corresponding to the through-hole,
the lid member comprises a circuit-board support supporting the circuit board and an attachment target portion for the cap member to be, detachably attached,
the cap member comprises a cap member body disposed outside the cylindrical case and configured to cover the through-hole, a cap member shaft extending from a bottom surface of the cap member body, and a cap member engagement portion extending from an end of the cap member shaft in a radial direction of the cap member shaft,
the sealing member comprises an annularly-shaped sealing member body surrounding the cap member shaft, a linear member extending from the sealing member body, and a sealing-member engagement shaft provided to an end of the linear member and extending along a direction intersecting the linear member,
the attachment target portion comprises: a shaft insertion hole into which the cap member shaft is insertable; an engagement-portion insertion hole into which the cap member engagement portion is insertable, the engagement-portion insertion hole being continuous with the shaft insertion hole; and an engagement-shaft insertion hole in which the linear member is rested the sealing-member engagement shaft being insertable into the engagement-shaft insertion hole, and
the cap member is pivotally supported by the attachment target portion to be rotatable to take a first orientation and a second orientation, the cap member engagement portion being insertable into the engagement-portion insertion hole in the first orientation and engageable with the attachment target portion in the second orientation.

6. The physical quantity measuring device according to claim 5, wherein
a projection tapered toward an end is provided at a first end of the sealing-member engagement shaft, and
a dent is provided at a second end of the sealing-member engagement shaft along an axial direction of the sealing-member engagement shaft.

7. The physical quantity measuring device according to claim 2, wherein
the attachment target portion is provided with an engaging protrusion protruding toward the through-hole and engageable with the through-hole.

8. The physical quantity measuring device according to claim 2, wherein
the cap member engagement portion comprises a first engagement portion and a second engagement portion provided opposite the first engagement portion across the cap member shaft, the second engagement portion being sized differently from the first engagement portion, and
the engagement-portion insertion hole comprises a first-engagement-portion insertion hole corresponding to the first engagement portion and a second-engagement-portion insertion hole corresponding to the second engagement portion, the second-engagement-portion insertion hole being provided opposite the first-engagement-portion insertion hole across the shaft insertion hole.

9. The physical quantity measuring device according to claim 2, wherein
the cap member body is pentagonal.

* * * * *